United States Patent [19]

Church et al.

[11] 3,774,951
[45] Nov. 27, 1973

[54] BONDED ENERGY ABSORBING VEHICLE BUMPER MOUNT CONSTRUCTION

[75] Inventors: Herman S. Church, Cuyahoga Falls; James L. Hagener, Canton, both of Ohio

[73] Assignee: Teledyne Mid-America Corporation, Hartville, Ohio

[22] Filed: Sept. 20, 1972

[21] Appl. No.: 290,483

[52] U.S. Cl. ............................... 293/88, 267/63 A
[51] Int. Cl. ............................................. B60r 19/06
[58] Field of Search ..................... 213/8, 40 R, 40 S, 213/40 D; 267/63 A; 293/88, 71 R, 85

[56] References Cited
UNITED STATES PATENTS
| | | | |
|---|---|---|---|
| 3,680,903 | 8/1972 | Hulten | 293/71 R |
| 3,722,939 | 3/1973 | Church et al. | 293/88 |
| 2,508,347 | 5/1950 | Marsh | 293/85 |

Primary Examiner—Gerald M. Forlenza
Assistant Examiner—Robert Saifer
Attorney—John H. Bishop et al.

[57] ABSTRACT

A vehicle bumper mounting construction formed of a generally elongated box-like metal housing member enclosing a portion of an elongated beam member generally H-shaped in cross section. A pair of rubber pads having parallel surfaces are bonded on one surface of each pad to the web of the H-beam member on either side thereof. A metal plate is bonded to the other side of each pad. The H-beam and pads are secured within the housing member and the metal plate on each pad is secured to a side wall of the housing. The metal housing is provided with means for mounting the assembly on an automobile, and the H-beam is provided with a mounting flange for attaching the automobile bumper to the assembly. The rubber pads are pre-loaded to hold the components against rattling in the at-rest or normal position of the mount components. Impact energy applied to the bumper is absorbed by the construction by deflection of the H-beam placing shear stress on the rubber pads.

7 Claims, 5 Drawing Figures

PATENTED NOV 27 1973 3,774,951

3,774,951

BONDED ENERGY ABSORBING VEHICLE BUMPER MOUNT CONSTRUCTION

CROSS REFERENCE TO RELATED APPLICATIONS

The invention involves improvements on the bumper mounting construction shown and now described in our copending application, Ser. No. 201,335, filed Nov. 23, 1971 now Pat. No. 3,722,939. The anti-rattle construction shown but not claimed in this application is the subject matter of out separate copending application, U.S. Pat. No. 2,904,484 filed Sept. 20, 1973.

BACKGROUND OF THE INVENTION

1. Field of the Invention

The invention relates to vehicle bumper mount constructions of the energy absorbing type and particularly the invention relates to an energy absorbing automobile bumper mounting means employing rubber in shear as the energy absorbing member and having special means for assembling and securing the energy absorbing means within a housing as well as to an H-beam to which the bumper is connected, so as to obtain maximum energy absorbing capacity efficiency for the bumper mount components.

2. Description of the Prior Art

The constructions shown and described in copending application Ser. No. 201,335 involve bumper mount constructions that absorb, without vehicle damage, impact energy of low velocity collisions without sacrificing convenience of safety features of an automobile. The impact energy is absorbed in these bumper mount constructions by placing shear stress on rubber pads which are bonded to each side of the web of a removable H-beam on which the bumper is mounted and are bonded at the other pad sides to inner surfaces of a rectangular housing open at its ends which is connected to a frame member, or the like, of an automobile.

The prior constructions involve bonding the energy absorbing rubber pads to either side of the web of the H-beam during vulcanization of the rubber by what may be termed a "hot bonding" procedure, or involve bonding the rubber pads to the web of the H-beam after the pads have been vulcanized by a so-called "cold bonding" procedure which uses an adhesive between the contacting rubber and metal beam surfaces and is completed by heating the metal with hot air to establish the cold bond. After the pads are assembled with and bonded to the H-beam, the assembly then was inserted within the rectangular open ended housing and the outer surfaces of the pads were cold bonded to opposite inner surfaces of the housing.

The effectiveness, efficiency or strength of the mount to absorb impact energy by relative movement of the H-beam in the housing, resisted by shear stress developed in the rubber pads, is dependent to a large measure upon the strength or efficiency of the bond established between the rubber pad surfaces and the metal surfaces of the H-beam and housing.

It is generally recognized that a hot bond is much stronger than usual cold bonds that can be developed economically in production. Thus, in the prior manufacture of the bumper mounts as described in copending application Ser. No. 201,335, cold bonding production procedures used have produced bonds which desirably should be stronger.

Accordingly, a need has existed for a rugged bumper mount construction having the outstanding, favorable and beneficial characteristics of the constructions shown in copending application Ser. No. 201,335, while providing a hot bond at all locations where the impact absorbing rubber pads are bonded to metal components so as to provide the highest bond strength or energy abosrbing capacity efficiency.

SUMMARY OF THE INVENTION

Objectives of the invention include providing a vehicle bumper mount construction wherein a generally box-like metal housing member enclosing a generally H-shaped elongated metal beam with energy absorbing rubber pads between the housing and beam, and with a hot bond between connected metal and rubber portions of the housing, H-beam and rubber pads; providing a bumper mount assembly construction with a hot bond between assembled metal and rubber components in which pull-out and anti-rattle devices may be incorporated; providing a new bumper mount construction which combines the described new favorable characteristics along with the favorable characteristics of prior constructions without sacrificing convenience or safety features of the vehicle, and which is adapted for use in a wide variety of models and styles of commercially made automobiles; and providing a construction which is rugged and which has simple stamped metal and rubber components, which is easy and economically manufactured without undue cost elements as compared with rigid type bumper mounting constructions and which satisfies the foregoing objectives.

These objectives and advantages may be obtained by the bumper mount construction, the general nature of which may be stated as including, in bumper mounting means of a type including an elongated metal housing having top and bottom walls and opposite side walls and open at front and rear ends, an elongated metal beam of generally H-shaped cross section located within the housing, and having a web portion spaced between the opposite side walls, and top and bottom flanges spaced closely adjacent to the housing top and bottom walls respectively, a front portion of the H-beam extending outward from the housing interior from the front open end of the housing, and the rear end of the H-beam being located adjacent to the rear open end of the housing, energy absorbing elastic preferably rubber pads connected to the metal housing and to opposite surfaces of the metal H-beam web to hold the H-beam within the housing; the combination of metal plates at one surface of each pad, a hot bond connection between each metal plate and its rubber pad, and a hot bond connection between the pads and the metal H-beam web; interengaged abutments between the metal plates and metal housing locking the plates in fixed assembled position within the housing; the pad rubber being preloaded and held in pre-loaded condition when the plates are locked to the housing; and preferably interengageable anti-pull-out means on the housing and H-beam preventing the H-beam from being pulled out of the front end of the housing; and preferably anti-rattle pad means held compressed between the interengageable anti-pullout means by the rubber pad pre-load; whereby the hot bond between the rubber pads and the metal components of the bumper mount assembly provides meximum energy absorbing efficiency.

BRIEF DESCRIPTION OF THE DRAWING

A preferred embodiment of the invention - illustrative of the best mode in which applicants have contemplated applying the principles - is set forth in the following description and shown in the drawing and is particularly and distinctly pointed out and set forth in the appended claims.

Similar numerals refer to similar parts throughout the various figures of the drawing.

DESCRIPTION OF THE PREFERRED EMBODIMENT

Figure 1:
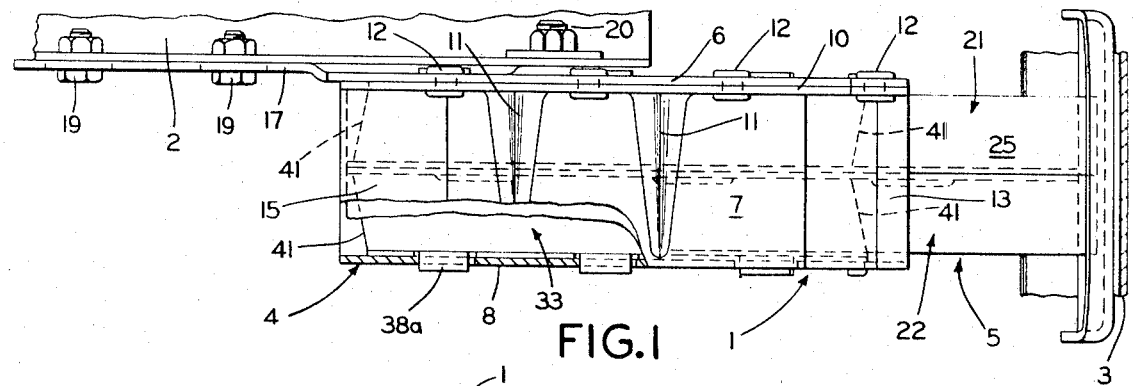
FIG. 1 is a top plan view of the improved bumper mount construction mounted on an automobile frame element and mounting a bumper.

The energy absorbing bumper mount is indicated generally at 1 mounted on a frame member 2 of an automobile and serving as a mount for a bumper 3. The bumper mount 1 includes a box-like housing generally indicated at 4 and a generally H-shaped elongated beam-like member 5 extending through the housing 4 and projecting from the front end thereof as shown in FIGS. 1 and 2.

The housing 4 and H-beam 5 preferably are constructed to include anti-pull-out and anti-rattle means such as shown in our separate copending application Ser. No. 201,335. Thus, the housing 4 may be formed by a mounting plate 6, and a generally channel-shaped flanged member having a top wall 7, a side wall 8, a bottom wall 9 and top and bottom assembly flanges 10.

Figures 3, 4:
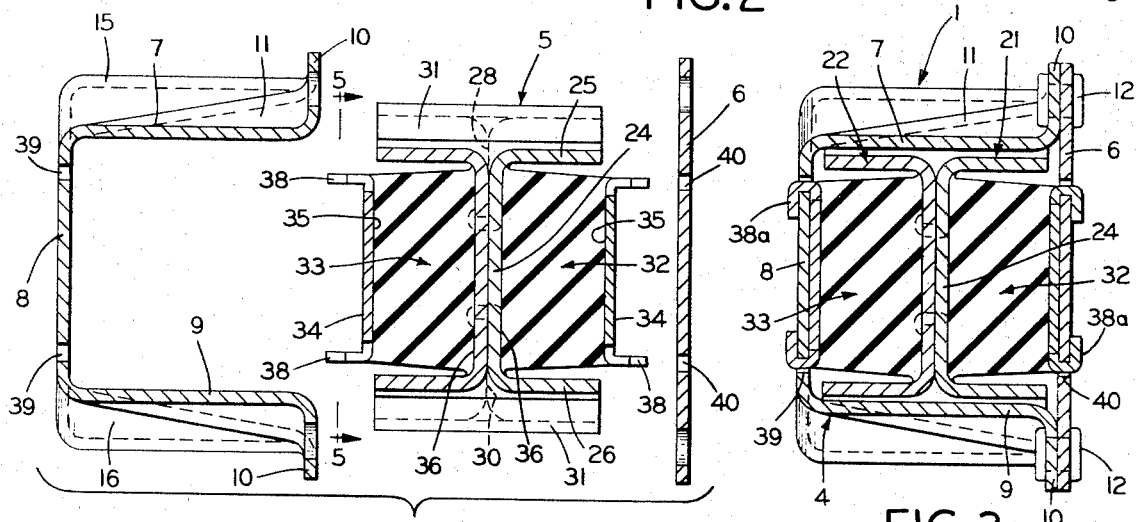
FIG. 3 is a vertical sectional view taken on the line 3—3, FIG. 2.
FIG. 4 is an exploded sectional view illustrating the parts shown in FIG. 3 before assembly.

Mounting plate 6 forms a side wall opposite side wall 8 of the housing 4, which as stated, is generally rectangular in cross section (FIG. 3). Tapered reinforcing corrugations 11 may be formed in the top and bottom housing walls 7 and 9 to provide stiffness and rigidity to the housing 4. The assembly flanges 10 are riveted 12 to the housing mounting plate 6 to complete the housing assembly.

Figure 2:
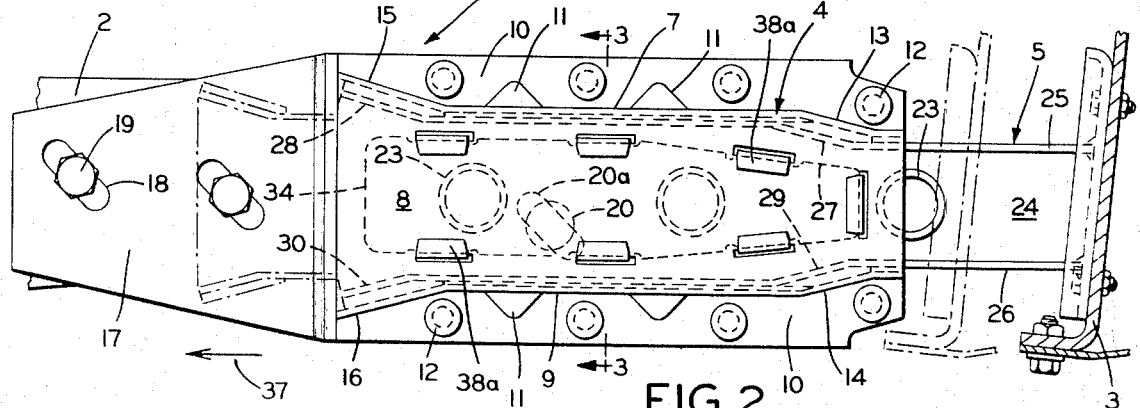
FIG. 2 is a side view of the construction shown in FIG. 1.

Ramp formations 13 and 14 are formed in the right hand or front end portions of the top and bottom housing walls 7 and 9, and similar ramp formations 15 and 16 are formed at the rear ends of the housing top and bottom walls 7 and 9, as shown in FIG. 2. These ramp formations converge toward the front end of the housing 4, that is to the right viewing FIG. 2.

The mounting plate 6 may have an offset portion 17 formed with slotted openings 18 engaged by bolts 19 for mounting the bumper mount 1 on the automobile frame member 2. An additional bolt 20 also may be engaged through a slotted opening 20a in mount-ing plate 6 with the automobile frame member 2.

The H-beam 5 is composed of two channel members 21 and 22, which may be formed from flat plates of steel or the like. The two channels 21 and 22 preferably are riveted together at several zones indicated at 23, and the web 24 of the H-beam formed by the assembled channels 21 and 22 extends vertically as shown in FIGS. 1 and 3.

The top and bottom flanges 25 and 26 of the H-beam 5 (FIGS. 1, 3 and 4) generally have a configuration in vertical section (FIG. 3) complementary to the configuration of the top and bottom housing walls 7 and 9. The top and bottom beam flanges 25 and 26 extend horizontally with respect to the H-beam web 24, in cross section, at any section, as shown in FIGS. 1 and 2.

Thus, the H-beam top flange 25 is formed with ramp portions 27 and 28 matching ramp portions 13 and 15 of the housing top wall 7; and the bottom flange 26 of H-beam 5 similarly is formed with ramp portions 29 and 30 matching the housing ramp portions 14 and 16.

Anti-rattle pads 31 may be secured to the H-beam ramp portions 27, 28, 29 and 30 in any desired manner either by a hot or a cold bond. The provision of the ramps on the H-beam 5 and housing 4 and of the anti-rattle pads 31, is preferred to provide the anti-pull-out and anti-rattle means described in out separate copending application U.S. Pat. No. 2,904,484.

A pair of energy absorbing rubber pads or blocks generally indicated at 32 and 33 are assembled with one pad on either side of the H-beam web 24 and the outer face of each pad enclosed by one of the housing mounting plate 6 or side wall 8, generally as shown in FIG. 3. Each of the rubber pads 32 and 33 in accordance with the invention, has a special bond connection with other components.

Referring to the H-beam 5 in the central portion of FIG. 4, the pads 32 and 33 each have a metal plate 34 bonded to an outer face 35 of the rubber portion of pad 32 or 33. The inner faces 36 of the rubber portions of pads 32 and 33 also are bonded to the outer surfaces of the web 24 of H-beam 5. The bonds between the rubber in pads 32 and 33 and the metal H-beam 5 and metal plates 34 is a "hot" bond formed in a mold during vulcanization of the rubber. This feature provides maximum efficiency for the bond and thus maximum energy absorbing strength for the pads, which are placed under shear stress when the H-beam 5 moves in the direction of the arrow 37 in FIG. 2, to the dot-dash line position, when the bumper 3 encounters a collision force, or the like, to be absorbed.

Figure 5:
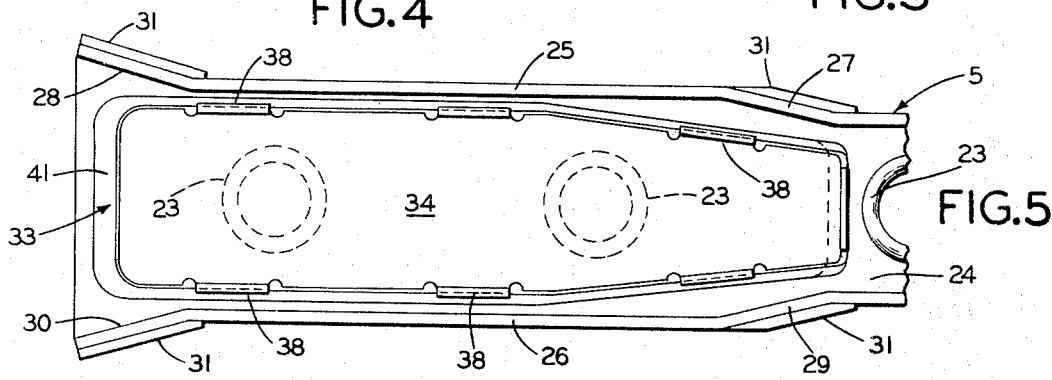
FIG. 5 is a fragmentary side view of an H-beam and pad assembly looking in the direction of the arrows 5—5, FIG. 4.

The plates 34 preferably are formed with a series of spaced right angular ears 38 along the upper and lower edges of the plates, as shown in FIGS. 4 and 5; and these ears are clinched, as illustrated at 38a, after being projected through slots 39 and 40 formed in the side wall 8 and mounting plate 6 of the housing 4, as shown in FIGS. 1, 2 and 3.

The manufacture of the improved bumper mount construction involves forming the metal parts, that is the metal plates 34, the metal channels which are secured together to form the H-beam 5, the metal housing mounting plate 6 and the flanged metal channel-shaped housing member comprising the top, side and bottom walls 7, 8 and 9 and assembly flanges 10. The H-beam 5 and plates 34 and uncured rubber are placed in a vulcanizing mold and the rubber is vulcanized to bond the rubber pads 32 and 33 to the metal components. This sub-assembly of H-beam 5 and rubber pads with bonded plates then is assembled between the mounting plate 6 and housing side wall 8, the ears 38 clinched, and the flanges 10 riveted at 12 to the housing mounting plate 6 to com-plete the assembly.

In so assembling the housing, H-beam and rubber pad components with the clinched ears 38a and rivets 12, the energy absorbing rubber pads 32 and 33 are pre-loaded as indicated by the angular lines 41 at the ends of the pad rubber in FIG. 1, so as to hold the anti-rattle pads 31 under compression between the ramp portions of the H-beam 5 and housing 4, as shown in the full line position of FIG. 2.

Such pre-loading holds the H-beam 5 in the at-rest, no-load position illustrated in FIG. 1, centered with respect to its housing 5, and free of rattling since the metal components do not and cannot contact one another. In referring to the "no-load" position of the H-beam, it is understood that the bumper mount is in a position before being subjected to a collision force which will load the mount with energy to be absorbed. The "no-load" position statement does not imply the absence of a pre-load to maintain the anti-rattle characteristics of the construction.

The primary aspect of the invention involves the provision of a hot bond between the rubber energy absorbing pads and the metal components to which the rubber is secured, as distinguished from utilizing a cold bond at any one of the bonded metal-to-rubber unions. The improved construction which encompasses this concept thus provides a rugged, stable and efficient bumper mount for absorbing collision energy inparted to a bumper supported on the mount construction. In addition, the structure involving the hot bonds for maximum strength and energy absorbing efficiency can incorporate all of the desirable and favorable features of the types of energy absorbing bumper mounts disclosed in the copending applications referred to, that is the ability to accept a bumper jack in lifting an automobile, the ability to prevent rattling, and the ability to prevent pull-out of the H-beam from the housing to which the beam is connected through the energy absorbing rubber pads.

Accordingly, the present invention provides a construction which enables convenience and safety features for a vehicle to be retained for energy absorbing bumper mounts which may be used in a wide variety of models and styles of commerical automobiles; provides a construction which is rugged, which has simple stamped metal and rubber components, and which has extremely strong metal-to-rubber union bonds; provides a construction which incorporates all of the described desirable features and which is easy and economically manufactured; and provides a construction satisfying the described objectives, achieving the new results indicated, and solving problems and satisfying needs which have existed in the art.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and is not limited to the exact details of construction shown or described.

Having now described the features, discoveries, and principles of the invention, the manner in which the improved bumper mount construction may be made, the characteristics of the new construction, and the advantageous, new and useful results obtained; the new and useful structures, devices, elements, arrangements, parts and combinations are set forth in the appended claims.

We claim:

1. In vehicle energy absorbing bumper mount construction of a type including an elongated metal housing having top and bottom walls and opposite side walls and open at front and rear ends, an elongated metal bumper of generally H-shaped cross section located within the housing, and having a web portion spaced between the opposite side walls, and top and bottom flanges spaced closely adjacent to the housing top and bottom walls respectively, a front portion of the H-beam extending outward from the housing interior from the front open end of the housing, the rear end of the H-beam being located adjacent to the rear open end of the housing, energy absorbing rubber pad means connected to the metal housing and to opposite surfaces of the metal H-beam web to hold the H-beam within the housing; the combination of rubber pad means composed of rubber pads and metal plates at one surface of each pad, and a hot bond connection between each metal plate and said one surface of each pad, and a hot bond connection between a second surface of each pad opposite said one surface and the matel H-beam web; and means interengaged between the metal plates and metal housing locking the plates in fixed assembled position within the housing.

2. The construction defined in claim 1 in which the means interengaged between the plates and housing include ears formed on one of the plates and housing walls, ear receiving openings formed in the other of the plates and housing walls, and the ears extending through said openings and being clinched to lock the plates in fixed assembled position within the housing.

3. The construction defined in claim 2 in which the ears are formed on the plates, and in which the openings are formed in the housing walls.

4. The construction defined in claim 3 in which the metal H-beam web extends vertically and in which the openings are formed in opposite side walls of the housing.

5. The construction defined in claim 4 in which the housing includes a channel-shaped member forming the top, bottom and one side wall of the housing; in which a mounting plate member is secured to the channel member; and in which the ear-receiving openings are formed in the mounting plate member and channel side wall.

6. The construction defined in claim 1 in which ramp-like anti-pull-out formations are formed at the front and rear end portions of the top and bottom housing walls; in which similar ramp-like anti-pull-out formations also are formed at the top and bottom portions of the H-beam adjacent the housing formations; and in which the energy absorbing rubber pad means are pre-loaded when the plates thereof are locked in fixed assembled position within the housing.

7. The construction defined in claim 6 in which anti-rattle pads are located between adjacent ramp-like formations on the housing and H-beam; and in which the anti-rattle pads are held under compression by the pre-loaded rubber pad means.

* * * * *